US009591158B2

(12) United States Patent
Berke et al.

(10) Patent No.: US 9,591,158 B2
(45) Date of Patent: Mar. 7, 2017

(54) SYSTEM AND METHOD FOR DOCUMENT SIZE DETECTION IN A DOCUMENT REPRODUCTION DEVICE

(71) Applicant: Xerox Corporation, Norwalk, CT (US)

(72) Inventors: David Berke, London (GB); Gary Maxwell Smith, London (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/728,468

(22) Filed: Jun. 2, 2015

(65) Prior Publication Data

US 2016/0360056 A1    Dec. 8, 2016

(51) Int. Cl.
| | | |
|---|---|---|
| G06F 15/00 | (2006.01) | |
| H04N 1/00 | (2006.01) | |
| H04N 1/10 | (2006.01) | |
| H04N 1/028 | (2006.01) | |

(52) U.S. Cl.
CPC ..... *H04N 1/00748* (2013.01); *H04N 1/00702* (2013.01); *H04N 1/00737* (2013.01); *H04N 1/00771* (2013.01); *H04N 1/02865* (2013.01); *H04N 1/1061* (2013.01)

(58) Field of Classification Search
CPC ........... H04N 1/00702; H04N 1/00737; H04N 1/00748; H04N 1/00771; H04N 1/02865; H04N 1/1061
USPC ....................................................... 358/475
See application file for complete search history.

(56) References Cited

U.S. PATENT DOCUMENTS

| | | | | |
|---|---|---|---|---|
| 4,837,635 | A * | 6/1989 | Santos | H04N 1/3875 358/401 |
| 6,614,563 | B1 * | 9/2003 | Batten | H04N 1/0288 358/475 |
| 6,753,982 | B1 * | 6/2004 | Sheng | H04N 1/00681 250/559.19 |
| 2003/0218874 | A1 * | 11/2003 | Fujino | G02B 6/0036 362/612 |
| 2005/0259436 | A1 * | 11/2005 | Wang | H04N 1/02815 362/602 |
| 2006/0055718 | A1 * | 3/2006 | Endo | B41J 11/0095 347/14 |
| 2009/0135456 | A1 * | 5/2009 | Edwards | H04N 1/00519 358/497 |

* cited by examiner

*Primary Examiner* — Tammy Paige Goddard
*Assistant Examiner* — Mark Milia
(74) *Attorney, Agent, or Firm* — Philip E. Blair; Fleit Gibbons Gutman Bongini & Bianco P.L.

(57) ABSTRACT

What is disclosed is a system for determining the size of a document on a platen of a document scanning device. In one embodiment, the scanning device comprises in part: a transparent pane (platen) whereon a hardcopy print is placed; a scan head comprising optical sensors which output a signal comprising an image of that hardcopy print; a plurality of LEDs positioned such that a topside of the platen is illuminated; and a processor for instructing the scan head to pre-scan the print. During the pre-scan, optical sensors comprising the scan head sense light from the LEDs of areas of the platen not covered by the hardcopy print at a first intensity and sense light from the LEDs of areas of the platen which are covered by the print at a second intensity. The processor determines the size of the hardcopy print from the first and second intensity levels.

23 Claims, 11 Drawing Sheets

SYSTEM AND METHOD FOR DOCUMENT SIZE DETECTION IN A DOCUMENT REPRODUCTION DEVICE

TECHNICAL FIELD

The present invention is directed to systems and methods for determining the size and position of a document on a platen of a document scanning device.

BACKGROUND

It is important in the document reproduction arts to be able to automatically determine the size and position of a document placed on a platen of a document reproduction device.

BRIEF SUMMARY

What is disclosed is system and method for determining the size and position of a document on a platen of a document scanning device. A scanning device is disclosed which comprises, in part, a transparent pane (platen) whereon a hardcopy print is placed, a light source for illuminating an underside of the platen, and scan head comprising a plurality of optical sensors. In one embodiment, the present system utilizes a plurality of light emitting diodes (LEDs) positioned such that a topside of the platen is illuminated thereby. At least one processor activates the LEDs and then instructs the scan head to pre-scan the hardcopy print. During the pre-scan, optical sensors of the scan head sense light from the LEDs of areas of the platen not covered by the hardcopy print at a first intensity and sense light from the LEDs of areas that are covered by the hardcopy print at a second intensity. A border and a location of the hardcopy print on the platen are then determined from the first and second intensity levels. Features and advantages of the above-described system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for determining a border and a location of a hardcopy print placed on a platen of a document scanning device.

Non-Limiting Definitions

A "hardcopy print" is intended to refer to a wide array of physically rendered prints such as, for example, papers, brochures, magazines, pictures, photos, etc., which can be placed on a platen of a scanning device to be scanned into a digitized format. Hardcopy prints typically contain objects such as, for instance, text, graphics, pictures, charts, and the like, which are often overlaid on a substantially uniformly colored background which often is white space.

Figure 1:
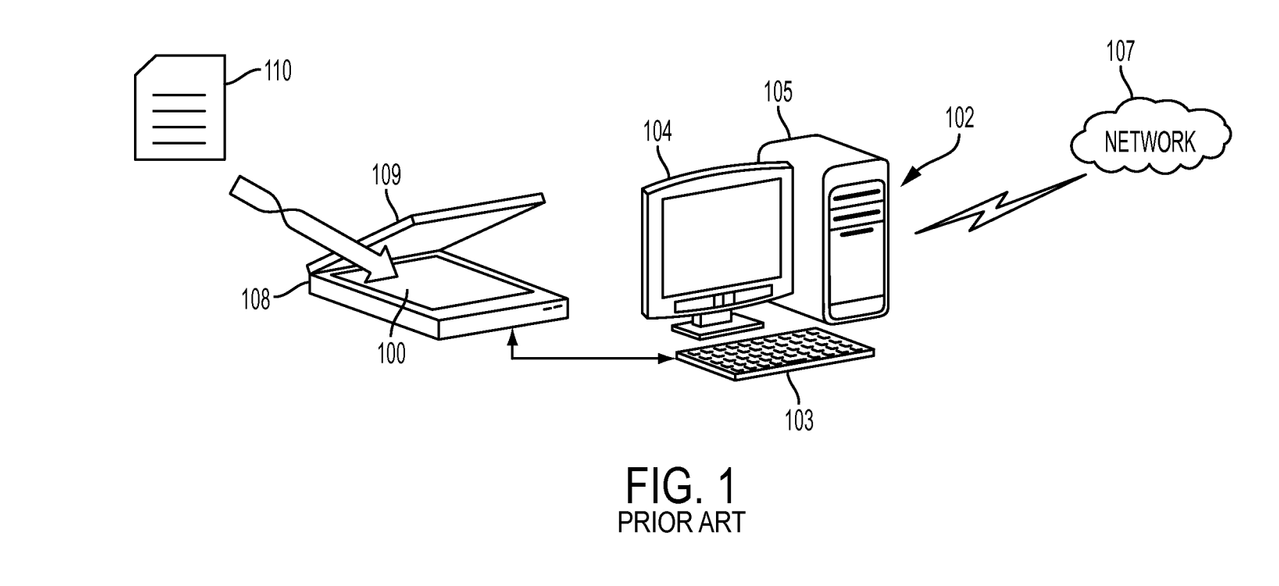
FIG. 1 shows a computer workstation in communication with a scanning device.

A "scanning device", or simply "scanner", refers to a device that optically scans a hardcopy print and outputs a signal comprising an image of that print in a digitized format. The signal can be saved to a memory or storage device or communicated to a printer which prints reproductions thereof. A scanning device may be integrated into a wide array of multifunction document reproduction devices as are generally known in the arts. Such devices typically incorporate a user interface such as touchscreen and a display with a keyboard for effectuating a human interaction therewith through a plurality of user selectable menu options. One or more functions, features, and capabilities performed by a computer system or special purpose processor may be integrated, in whole or in part, with computer workstation. The document reproduction system of system of FIG. 1 is shown generally comprising a computer workstation 102 which includes a keyboard 103, monitor 104, computer case 105 which houses a motherboard, processor, hard drive, CD-ROM drive, and a network interface card (not shown), to name a few components. It should be appreciated that the workstation has an operating system and other specialized software configured to display alphanumeric values, menus, scroll bars, dials, slideable bars, pull-down options, selectable buttons, and the like, for entering, selecting, modifying, and accepting information needed for performing various aspects of the teachings disclosed herein. The workstation is shown having been placed in communication with one or more devices over wireless network 107. Scanner 108 scans a hardcopy print 110 and a signal of sensed light intensities is aggregated to form a digital representation of the scanned print. Although shown as a desktop computer, it should be appreciated that the workstation 102 can be a laptop, mainframe, tablet, notebook, smartphone, or a special purpose computer such as an ASIC, or the like. The embodiment of the workstation is illustrative and may include other functionality known in the arts.

A "transparent pane (platen)", shown at 100 in FIG. 1, is typically a pane of clear glass. The hardcopy print to be scanned is placed on the platen. The front-side of the hardcopy print is the side which is face down on the top-side of the platen. The back-side of the hardcopy print is the side which faces away from the platen. There is a cover 109 which is lowered on to the platen.

A "scan head", as are generally known in the document reproduction arts, has sensors mounted thereon which optically receive an image of the hardcopy print placed on the platen. Many scan heads utilize a charge-coupled device (CCD) or a contact image sensor (CIS) as their sensors. CCD type scanners typically contain rows of optical sensors with red, green, and blue filters. Some scanners having a moving set of red, green, and blue LEDs. The sensors of the scan head output a signal of light intensities sensed as the scan head moves beneath the platen.

A "pre-scan" is an operation whereby the scan head moves beneath the platen so that the optical sensors can sense light from a light source which illuminates a back-side of the hardcopy print. In one embodiment, the light source is a plurality of light emitting diodes.

Figure 2:
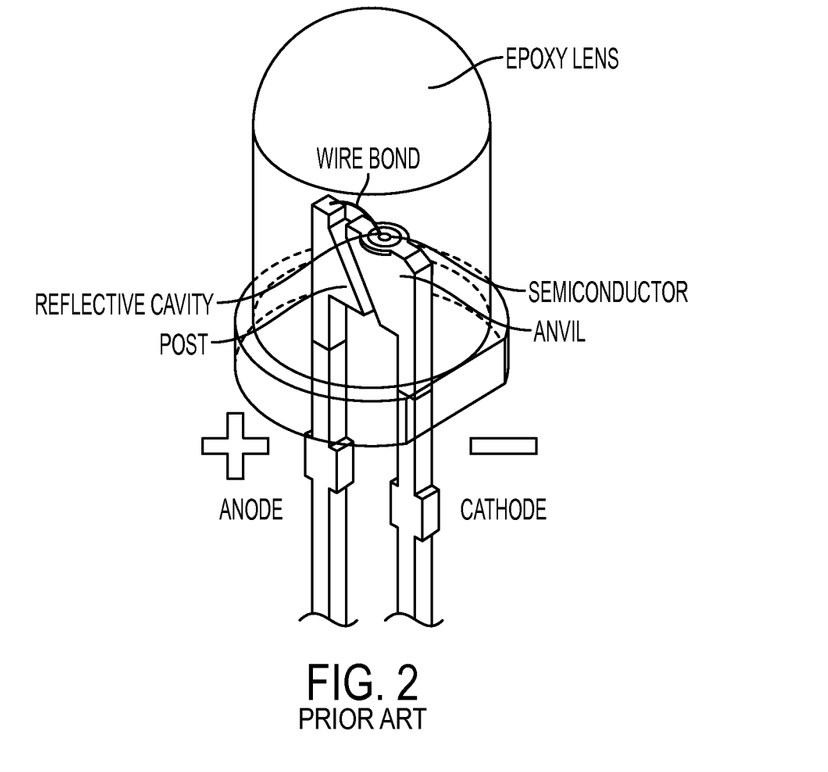
FIG. 2 shows one embodiment of a LED as are generally known in the arts.

A "light emitting diode (LED)", as is generally understood, typically consists of a two-lead semiconductor (typically a PN-junction diode) that illuminates when a suitable voltage is applied. The electrified diode energy in the form of photons. This effect is often referred to as electro-luminescence. The color of the light emitted by the diode is determined by the energy band gap of the semiconductor comprising the diode. FIG. 2 shows one embodiment of a generic LED as are widely understood. In one embodiment, the LED emits a green light, although any colored LEDs can be employed. The plurality of LEDs can be fixed to an underside of a cover of the platen or fixed to a substrate which, in turn, is affixed to an underside of a cover of the platen. The plurality of LEDs can be fixed to a substrate which is removable.

Figure 3:
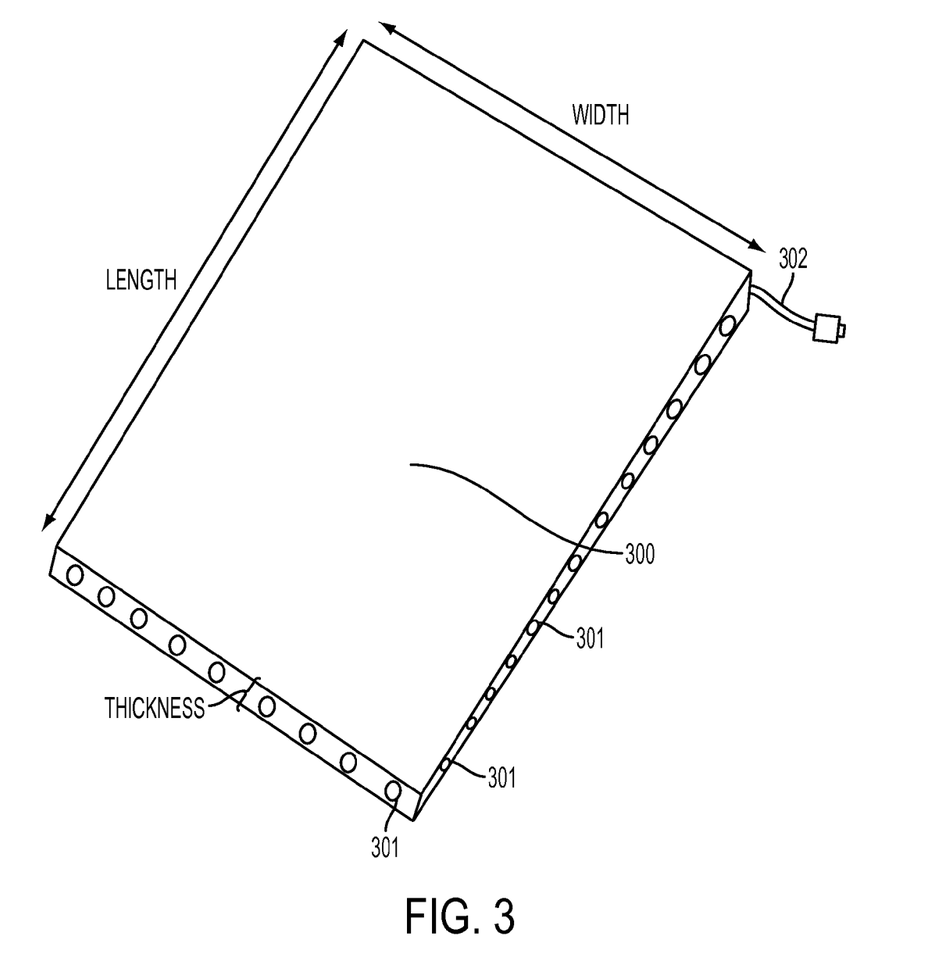
FIG. 3 shows an example substrate comprising a clear plastic sheet having a desired length, width, and thickness, to which a plurality of LEDs are affixed around the edges thereof.
Figure 4:
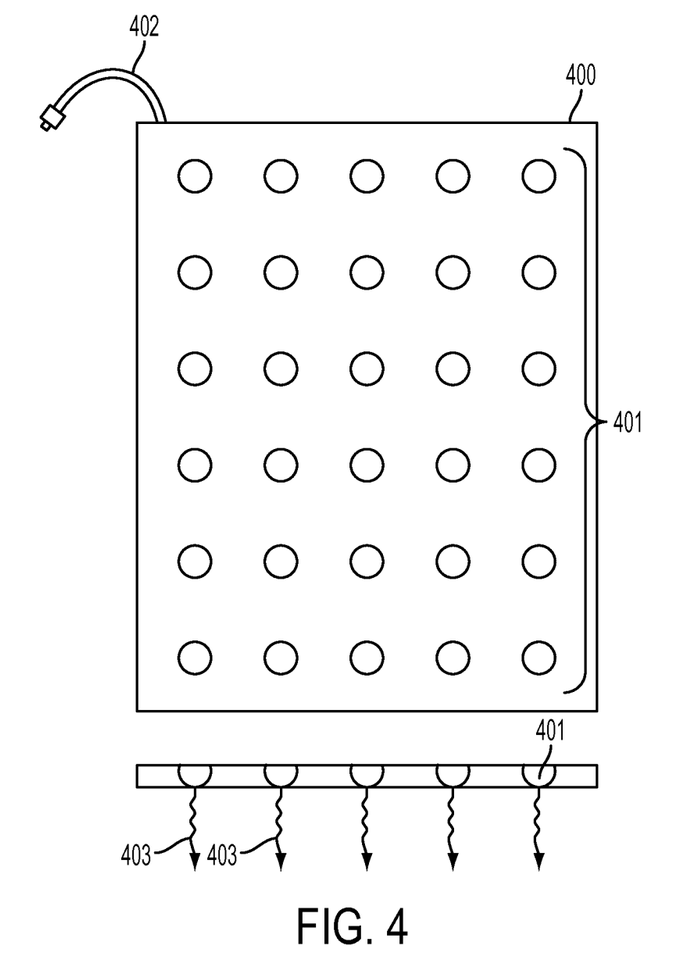
FIG. 4 shows a substrate material to which a plurality of LEDs are affixed thereto in a plurality of substantially uniform rows.

A "substrate" is a material to which LEDs are fixed and through which light can propagate. The material may be hard or flexible, clear, translucent or colored. Materials through which light can propagate include glass, plastic, plexiglass, acrylic and various embodiments of polystyrene, to name a few. FIG. 3 shows an example substrate material 300 comprising a clear acrylic sheet having a pre-defined length, width, and thickness, to which a light source comprising a plurality of LEDs 301 are affixed around the sides thereof. Electrical power is supplied to the light source by power cord 302 which, in this embodiment, comprises a USB connection. The material comprising the substrate of FIG. 3 is such that the light emitted by the LEDs propagates transversely therethrough such that the whole material lights emits light onto the platen when the LEDs are activated. FIG. 4 shows a substrate material 400 comprising a clear acrylic sheet with a light source comprising a plurality of LEDs 401 affixed thereto in substantially uniform rows with electrical power being supplied thereto by power cord 402. The light emitted by the array of LEDs 401 propagates through the substrate 400 and illuminates 403 the top-side of the platen.

Figure 5:
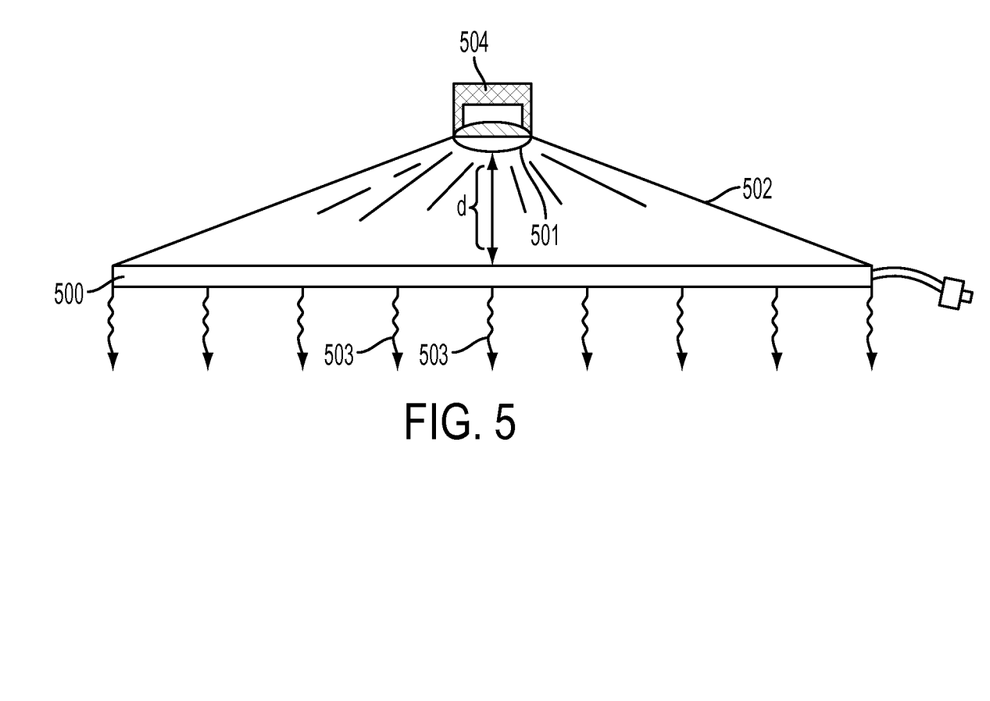
FIG. 5 shows another embodiment where the substrate material comprises a transparent plexiglass to which a light source is affixed to a hood.

FIG. 5 shows yet another embodiment where the substrate material 500 comprises a transparent plexiglass to which a light source 501 comprising a light bulb is affixed to a hood 502 or cover which serves to suspend the light source a distance d above the substrate material 500. The projected light from the light source propagates through the substrate material and illuminates 503 the top of the platen where the hardcopy print rests. Handle 504 enables a user to lift, place and remove this configuration as needed. Power cord provides an electrical connection to the light source 501. Although light source 501 is shown as a single bulb, it may be a plurality of lights.

Figure 6:
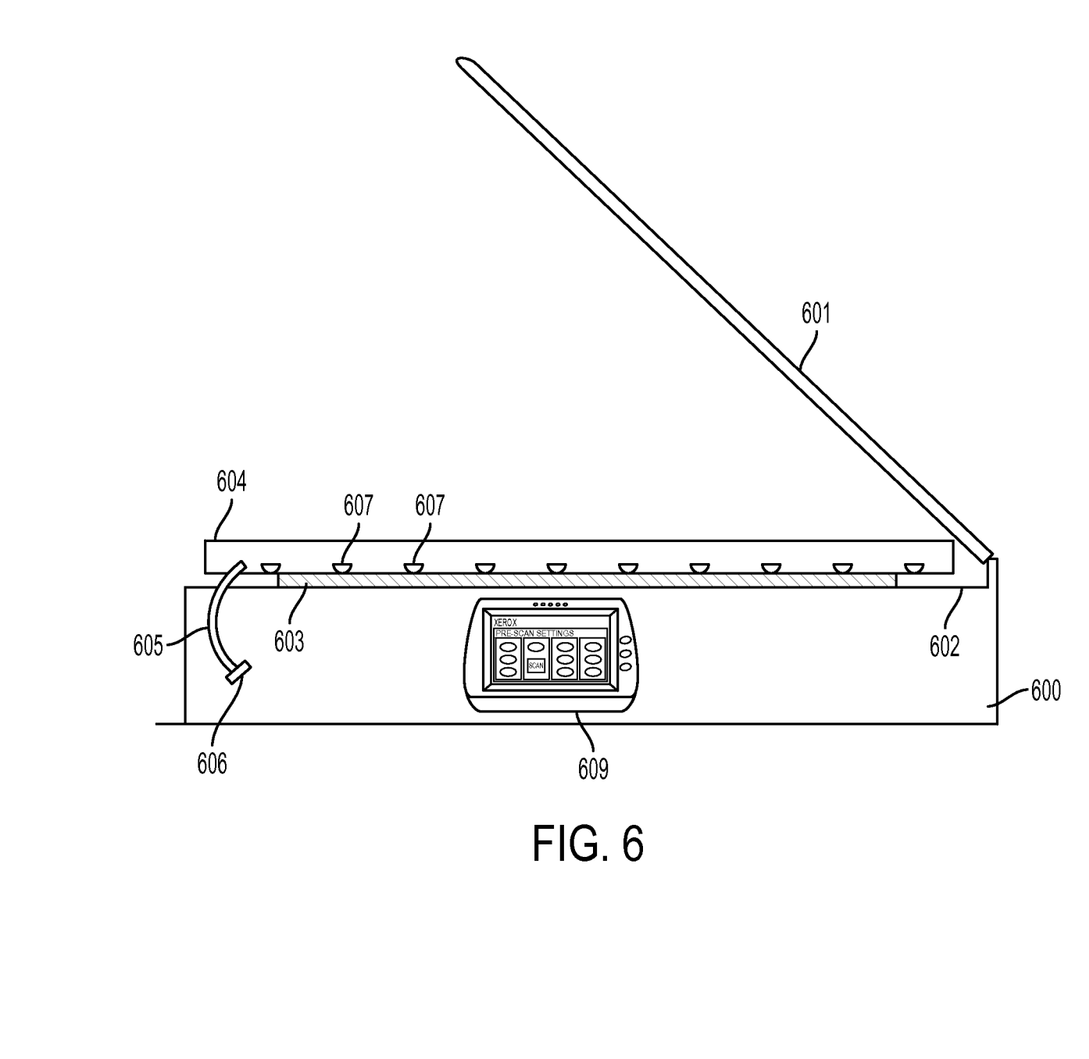
FIG. 6 shows a scanning device with a raised cover along with a hardcopy print placed faced down on the platen beneath a substrate material and plurality of light sources as shown and discussed with respect to FIGS. 3 and 4.

FIG. 6 shows scanning device 600 with a cover 601 having been raised off the platen 602. Resting face down on the platen is hardcopy print 603. Resting on top of the platen and hardcopy print is substrate material 604 (as shown in either of the embodiments of FIG. 3 or 4) with a plurality of light sources 607 illuminating the back-side of the hardcopy print and the top-side of the platen. Power cord 605 is connected to USB port 606 of the scanning device. Also shown integrated into the scanning device 600 is a touch-screen control panel 609 for enabling a user to interact with the scanner and the substrate material and light sources, and to set various user desired settings and configurations.

Figure 7:
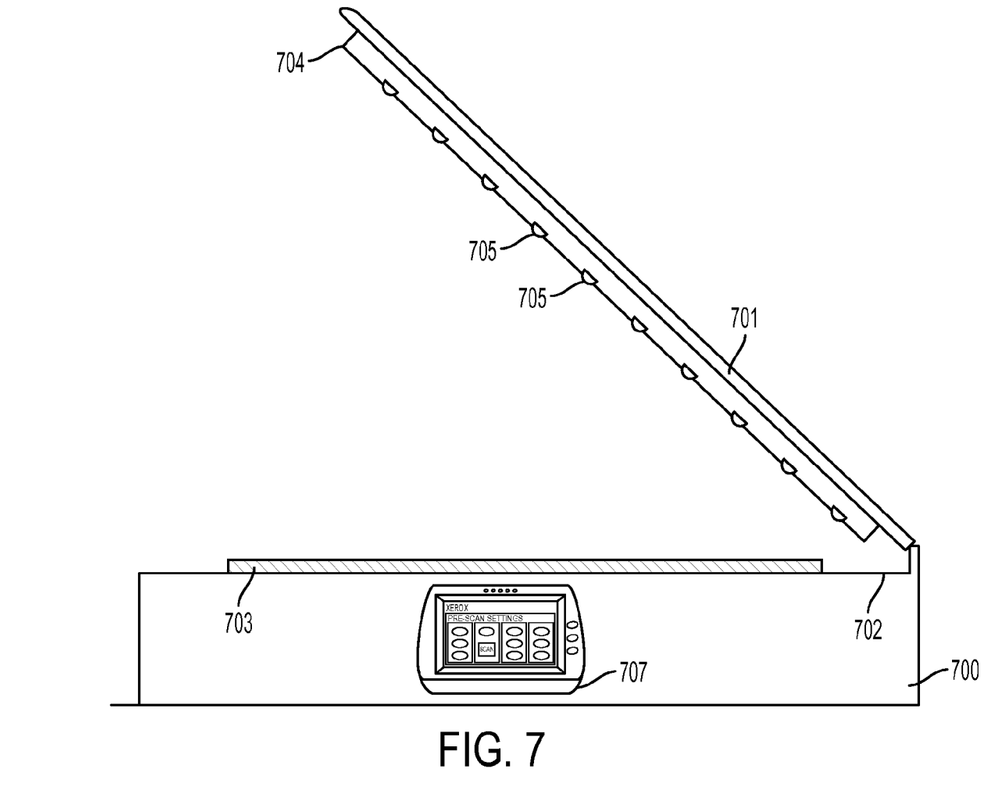
FIG. 7 shows a scanning device with a hardcopy print placed faced down on the platen with a raised cover wherein the substrate material and plurality of light sources are attached or integrated therewith.

FIG. 7 shows scanning device 700 with a cover 701 having been raised off the platen 702. Resting face down on the platen is hardcopy print 703. Attached to the platen is substrate material 704 (as shown in either of the embodiments of FIG. 3 or 4) with a plurality of light sources 705. When the cover is lowered, the light sources illuminates the back-side of the hardcopy print and the top-side of the platen. The substrate material itself may be, for example, an illuminable acrylic sheet or board, an electroluminescent backlight panel, an illuminated diffusion sheet, or an LED panel which can be attached to the cover 701 or integrated, in whole or in part, into the cover of the platen. Also shown integrated into the scanning device 700 is a touchscreen control panel 707 for enabling a user to interact with the scanner and the substrate material and light sources, and to set various user desired settings and configurations.

As the scan head moves beneath the platen of the scanning device, the scan head's optical sensors sense intensities of the light source(s) configured with the substrate material. Optical sensors moving directly beneath the print will output a signal at a first intensity level due to light from the light source having been blocked by the hardcopy print itself, while optical sensors which are not directly beneath the hardcopy print will output a signal at a second intensity level. The first and second intensity levels will be different as the scan head moves beneath the platen during a pre-scan operation. A grid or map of these intensity levels sensed by each optical sensor relative to their respective instantaneous X/Y location beneath the platen enables the borders or edges of the hardcopy print to be determined.

It should be appreciated that the light source(s) being utilized with the various configurations hereof can be different colors and the intensity of each light source may be user adjustable or dynamically variable. A back-side of the substrate (i.e., the side facing away from the platen) may be darkened, opaque, frosted, tinted, black, or covered with another material (such as rubber or rubberize foam) which substantially inhibits the passage of light therethrough. The type of light source used and its arrangement on or around the edges or perimeter of the substrate material may differ than the embodiments of FIGS. 3, 4 and 5 which are provided for explanatory and illustrative purposes. Any light source, pattern or random placement thereof can be configured as desired. Such variations and alternative embodiments shown and not shown are intended to fall within the scope of the appended claims.

Example Flow Diagram

Figure 8:
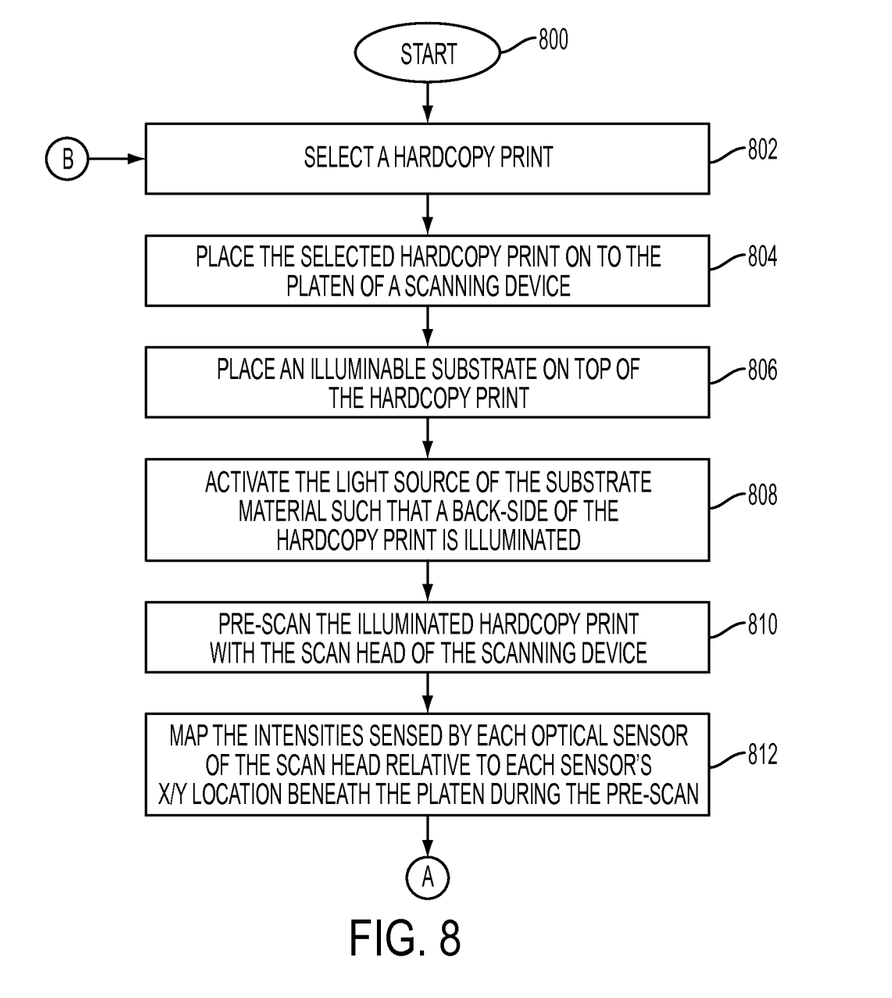
FIG. 8 is a flow diagram which illustrates one example embodiment of the present method for determining a border of a hardcopy print placed on a platen of the scanning device of, for example, FIG. 6.

Reference is now being made to the flow diagram of FIG. 8 which illustrates one example embodiment of the present method for determining a border of a hardcopy print placed on a platen of a scanning device of, for example, FIG. 6. Flow processing begins at step 800 and immediately proceeds to step 802.

At step 802, select a hardcopy print. One example hardcopy print is shown at 110 in FIG. 1.

At step 804, place the selected hardcopy print on a platen of a scanning device. One example scanning device is shown at discussed with respect to the embodiment of FIG. 6.

At step 806, place an illuminable substrate material on top of the hardcopy print on the platen.

At step 808, activate the light source of the substrate material such that a back-side of the hardcopy print is illuminated.

At step 810, pre-scan the illuminated hardcopy print with the scan head of the scanning device. As the scan head moves beneath the platen, the optical sensors of the scan head sense light from the light source of areas of the platen not covered by the hardcopy print at a first intensity and sense light from the light source of areas of the platen covered by the hardcopy print at a second intensity.

At step 812, map the intensities sensed by each optical sensor of the scan head relative to each sensor's X/Y location beneath the platen during the pre-scan.

Figure 9:
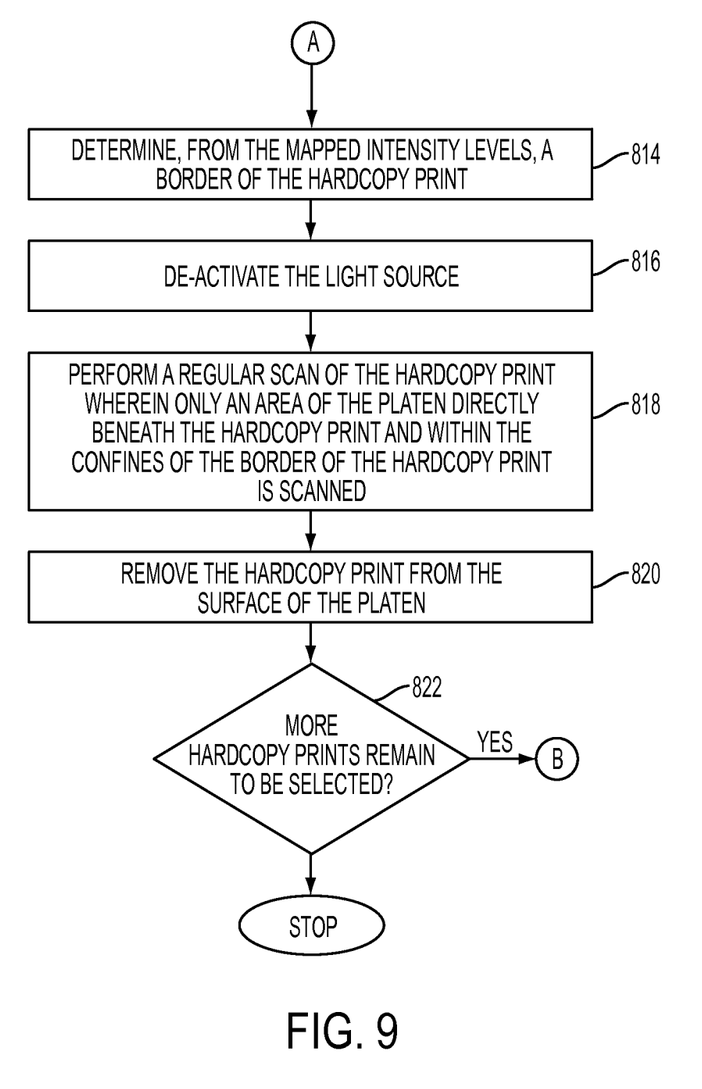
FIG. 9 is a continuation of the flow diagram of FIG. 8 with flow processing continuing with respect to node A.

Reference is now being made to FIG. 9 which is a continuation of the flow diagram of FIG. 8 with flow processing continuing with respect to node A.

At step 814, determine, from the mapped intensities, a border of the hardcopy print.

At step 816, de-activate the light source.

At step 818, perform a regular scan of the hardcopy print wherein only an area of the platen directly beneath the hardcopy print and within the confines of the border of the hardcopy print is scanned. This can be effectuated by selectively turning OFF various optical sensors or selectively discarding or otherwise ignoring their respective inputs.

At step 820, remove the hardcopy print from the surface of the platen.

At 822, a determination is made whether more hardcopy prints remain to be scanned. If so then flow processing continues with respect to node B wherein, at step 802, another hardcopy print is selected. The selected hardcopy print is placed face down on the platen and processing repeats in a similar manner until there are no more hardcopy prints to be selected. Thereafter, in this embodiment, further processing stops.

It should be appreciated that the flow diagrams depicted herein are illustrative. One or more of the operations in the flow diagrams may be performed in a differing order. Other operations may be added, modified, enhanced, or consolidated. Variations thereof are intended to fall within the scope of the appended claims.

Example Touchscreen Control Panel

Figure 10:
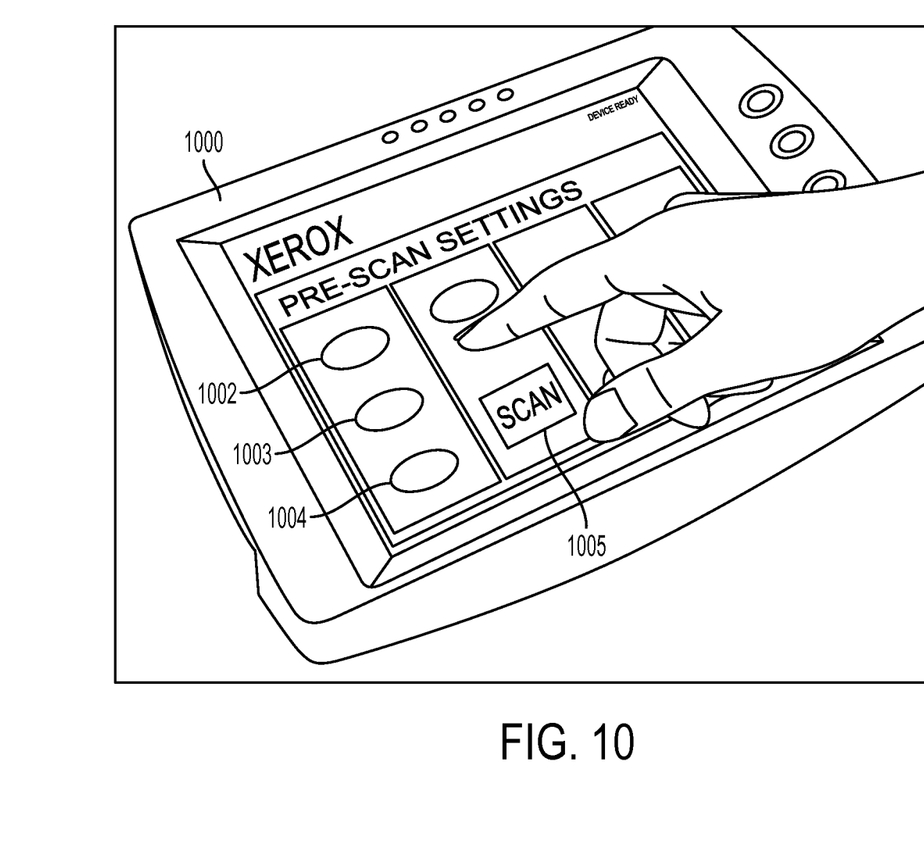
FIG. 10 show one embodiment of an example touchscreen control panel shown integrated with the scanning devices of FIGS. 6 and 7.

Reference is now being made to FIG. 10 which illustrates one example embodiment of a touchscreen control panel 1000 integrated with the scanning devices of FIGS. 6 and 7.

Touchscreen control panel 1000 is shown configured with a plurality of menus and buttons which, when pressed, effectuate various device settings and functionality. For example, Button 1002, when pressed, enables the user to activate one or more of the light sources of the substrate material. Button 1003 enables the user to adjust the color of any of the light sources of the substrate material. Button 1004 enables the user to adjust the intensity level of any of the light sources of the substrate material. Button 1005 enables the user to start the pre-scan operation in accordance with the various embodiments disclosed herein.

Figure 11:
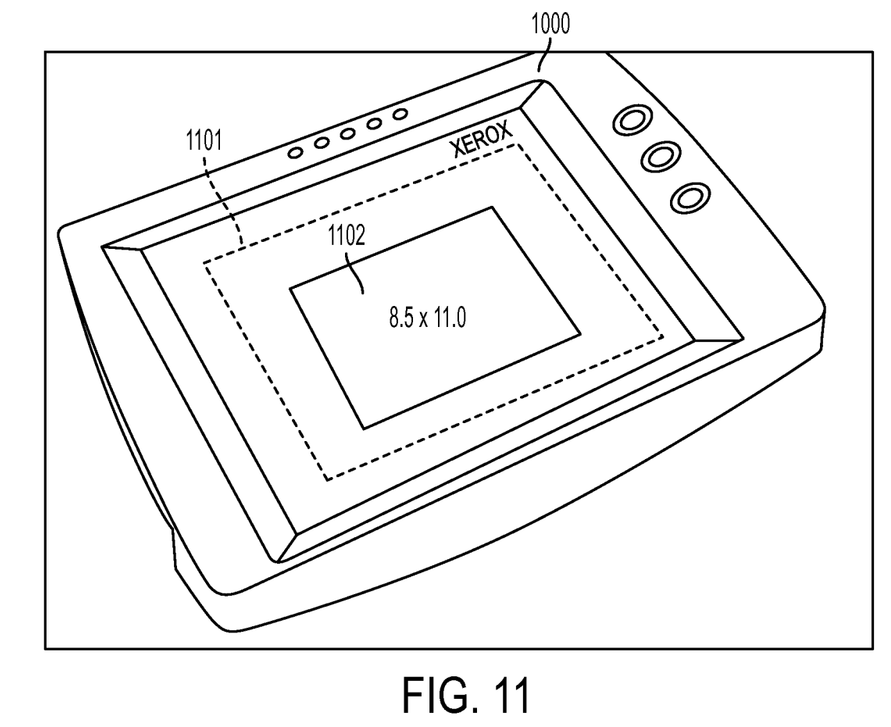
FIG. 11 shows the touchscreen control panel of FIG. 10 displaying an outline of the platen of the scanning device overlaid with the mapped borders of the pre-scanned hardcopy print.

Reference is now being made to FIG. 11 which, in one embodiment, shows the touchscreen panel 1000 of FIG. 10 displaying an outline 1101 of the platen of the scanning device overlaid with the mapped borders 1102 of the pre-scanned hardcopy print in its determined location on the platen. Also displayed are the dimensions of the hardcopy print for review. The dimensions of the hardcopy print can be determined by the length and width of the borders of the hardcopy print with respect to the known size of the platen.

Various Embodiments

The teachings hereof can be implemented in hardware or software using any known or later developed systems, structures, devices, and/or software by those skilled in the applicable arts without undue experimentation from the functional description provided herein with a general knowledge of the relevant arts. One or more aspects of the system and methods described herein are intended to be incorporated in an article of manufacture which may be shipped, sold, leased, or otherwise provided separately either alone or as part of a product suite or a service.

The above-disclosed and other features and functions, or alternatives thereof, may be desirably combined into other different systems or applications. Presently unforeseen or unanticipated alternatives, modifications, variations, or improvements may become apparent and/or subsequently made by those skilled in this art which are also intended to be encompassed by the following claims. The teachings of any publications referenced herein are hereby incorporated by reference in their entirety.

What is claimed is:

1. A method for determining a border of a hardcopy print placed on a platen of a document scanning device, the method comprising:

placing a hardcopy print on a platen of a scanning device comprising, at least in part, a scan head with a first set of light emitting diodes (LEDs) as a normal scan light source for illuminating a front-side of said hardcopy print during a normal scan and optical sensors which sense an intensity of light at each sensor's respective X/Y location as said scan head moves beneath said platen;

placing an acrylic sheet with a second set of LEDs as a pre-scan light source for illuminating a back-side of said hardcopy print during a pre-scan, wherein said acrylic sheet includes a handle and a hood to suspend said second set of LEDs above said back-side of said hardcopy print; and performing said pre-scan of said hardcopy print placed on said platen comprising:

activating said light source such that said back-side of said hardcopy print is illuminated on said platen;

using said scan head to scan said hardcopy print, said optical sensors sensing light from said pre-scan light source of areas of said platen not covered by said hardcopy print at a first intensity, said optical sensors sensing light from said pre-scan light source of areas of said platen covered by said hardcopy print at a second intensity; and determining, from said first and second intensities, a border of said hardcopy print.

2. The method of claim 1, wherein said pre-scan light source is integrated to an underside of a cover of said platen.

3. The method of claim 1, wherein said pre-scan light source is fixed to a substrate material that is attached to an underside of a cover of said platen.

4. The method of claim 1, wherein said pre-scan light source is fixed to a substrate material that is removable.

5. The method of claim 1, wherein said pre-scan light source is fixed around an edge of a substrate material.

6. The method of claim 1, further comprising determining a location of said hardcopy print relative to an edge of said platen.

7. The method of claim 1, further comprising determining a location of said hardcopy print placed on said platen.

8. The method of claim 1, wherein said pre-scan light source projects green light.

9. The method of claim 1, wherein, in response to having determined said border of said hardcopy print, performing a second scan wherein said scan head only scans a region of said platen within said determined borders of said hardcopy print.

10. The method of claim 1, further comprising displaying any of: intensity levels, a size of said hardcopy print, and a position of said hardcopy print on said platen.

11. The method of claim 1, wherein said first set of LEDs include red, green, and blue LEDs.

12. A scanning device for determining a border of a hardcopy print placed on a platen of said scanning device, the device comprising:
   a platen comprising a transparent pane on which a hardcopy print is placed;
   a scan head with a first set of light emitting diodes (LEDs) used as a normal scan light source for illuminating a front-side of said hardcopy print during a normal scan and optical sensors and a set of which sense an intensity of light at each sensor's respective X/Y location as said scan head moves beneath said platen;
   an acrylic sheet with a second set of LEDs as a pre-scan light source for illuminating a back-side of said hardcopy print during a pre-scan, wherein said acrylic sheet includes a handle and a hood to suspend said second set of LEDs above said back-side of said hardcopy print; and
   at least one processor executing machine readable program instructions for:
      activating said pre-scan light source;
      instructing said scan head to pre-scan said hardcopy print, said optical sensors sensing light from said pre-scan light source of areas of said platen not covered by said hardcopy print at a first intensity, said optical sensors sensing light from said pre-scan light source of areas of said platen covered by said hardcopy print at a second intensity; and
      determining a border of said hardcopy print from said first and second intensities.

13. The scanning device of claim 12, wherein said pre-scan light source is integrated to an underside of a cover of said platen.

14. The scanning device of claim 12, wherein said pre-scan light source is fixed to a substrate material that is attached to an underside of a cover of said platen.

15. The scanning device of claim 12, wherein said pre-scan light source is fixed to a substrate material that is removable.

16. The scanning device of claim 12, wherein said pre-scan light source is fixed around an edge of a substrate material.

17. The scanning device of claim 12, wherein said sensed light intensities are mapped relative to an X/Y dimension of said platen.

18. The scanning device of claim 12, further comprising determining a location of said hardcopy print relative to an edge of said platen.

19. The scanning device of claim 12, wherein said pre-scan light source projects green light.

20. The scanning device of claim 12, wherein, in response to having determined said border of said hardcopy print, performing a second scan wherein said scan head only scans a region of said platen within said determined borders of said hardcopy print.

21. The scanning device of claim 12, further comprising a control panel enabling a user thereof to at least turn said pre-scan light source ON/OFF.

22. The scanning device of claim 21, further comprising displaying any of: intensity levels, a size of said hardcopy print, and a position of said hardcopy print on said platen.

23. The scanning device of claim 12, wherein said first set of LEDs include red, green, and blue LEDs.

* * * * *